(12) United States Patent
Zhang

(10) Patent No.: US 6,809,725 B1
(45) Date of Patent: Oct. 26, 2004

(54) ON SCREEN CHINESE KEYBOARD

(76) Inventor: Jishan Zhang, 553 VFW Pkwy., Chestnut Hill, MA (US) 02467-3620

( * ) Notice: Subject to any disclaimer, the term of this patent is extended or adjusted under 35 U.S.C. 154(b) by 0 days.

(21) Appl. No.: 09/579,413

(22) Filed: May 25, 2000

(51) Int. Cl.$^7$ ................................................ G09G 5/00
(52) U.S. Cl. ...................... 345/171; 400/110
(58) Field of Search ................ 345/173, 174, 345/175, 176, 177, 178, 168, 169, 172, 171; 715/535; 341/22, 23; 400/109, 110, 484; 704/10

(56) References Cited

U.S. PATENT DOCUMENTS

| | | | | |
|---|---|---|---|---|
| 4,531,119 A | * | 7/1985 | Nakayama et al. | 345/171 |
| 4,543,631 A | * | 9/1985 | Kurosu et al. | 715/535 |
| 5,319,386 A | * | 6/1994 | Gunn et al. | 345/173 |
| 5,586,198 A | * | 12/1996 | Lakritz | 382/185 |
| 5,893,133 A | * | 4/1999 | Chen | 715/535 |
| 6,493,464 B1 | * | 12/2002 | Hawkins et al. | 382/189 |
| 6,535,204 B2 | * | 3/2003 | Sun | 345/173 |
| 6,562,078 B1 | * | 5/2003 | Yang et al. | 715/535 |

2002/0168107 A1 * 11/2002 Tang et al. ............... 382/187

* cited by examiner

*Primary Examiner*—Xiao Wu (57) ABSTRACT

An on-screen Chinese phonetic keyboard includes a function key section, an initial consonant key section, a vowel key section and a candidate section. The function key section is configured to allow on-line editing. The initial consonant key section is configured to enter an initial consonant of a desired Chinese character. The vowel key section includes less than 18 compound vowels and is configured to enter a vowel of the desired Chinese character. The candidate section is configured to enter the desired Chinese character. A method of entering a symbol of English keyboard before and after entering a Chinese character via the on-screen Chinese keyboard includes switching automatically to an English display mode in the candidate section of the on-screen Chinese keyboard; and selecting the symbol of English keyboard in the candidate section. A method of entering a Chinese phrase containing at least 3 Chinese characters includes entering the spelling of a first and a second characters of the Chinese phrase, displaying automatically all phrases from the database whose first two characters' spelling is identical to that entered by a user, and selecting the Chinese phrase shown in the candidate section.

22 Claims, 11 Drawing Sheets

ON SCREEN CHINESE KEYBOARD

BACKGROUND

An on-screen keyboard is a program that displays a virtual keyboard on a screen of a personal computer (PC) or an application-specific computer-based device (XPC), e.g., a web TV, a palm-size PC, or a personal digital assistant (PDA). An on-screen keyboard also allows users to enter data using a pointing device (e.g., a mouse), or a stylus if a touch-sensitive screen is supported.

On-screen keyboards were originally used to provide a minimum level of functionality for users with mobility impairments or for users who prefer not to type. On-screen keyboards are also particularly useful for users who prefer to enter data in a foreign language, especially on an information device designed primarily for use in English communities.

Many hand-held information devices incorporate an on-screen keyboard to eliminate the need for a physical keyboard, thus reducing the physical size of the hand-held devices.

SUMMARY

This invention relates to an on-screen Chinese phonetic keyboard.

In a general aspect of the invention, the on-screen Chinese phonetic keyboard includes a function key section, an initial consonant key section, a vowel key section, and a candidate section. The function key section is configured to allow on-line editing. The initial consonant key section is configured to enter an initial consonant of a desired Chinese character. The vowel key section includes less than 18 compound vowels and is configured to allow entry of a vowel of the desired Chinese character. The candidate section is configured to allow entry of the desired Chinese character.

Embodiments of this aspect of the invention may include one or more of the following features.

The vowel key section may include at least 7 compound vowels: "ie", "ue", "iu", "in", "un", "ui", and "ing". The vowel key section may include 15 simple vowels: "i", "u", "ü", "a", "o", "e", "ai", "ei", "ao", "ou", "an", "en", "ang", "eng", and "ong". The function key section may be positioned at a lower portion of the keyboard. The initial consonant key section may be positioned at an upper portion of the keyboard. The vowel key section may be positioned at a first side portion of the keyboard. And the candidate section may be positioned at a second side portion of the keyboard. A user may select a compound vowel not listed in the vowel key section by selecting the vowel "i" or the vowel "u" and then selecting a listed simple vowel.

The candidate section may have two display modes including a Chinese character candidate display mode and an English display mode. The Chinese character candidate display mode is for selecting the desired Chinese character or Chinese phrase. The English display mode is for selecting a desired English letter, a numeric, or a symbol. The candidate section may display either simplified Chinese characters or traditional Chinese characters in the Chinese character candidate display mode. The vowel key section may further include tone selection keys positioned adjacent to the candidate section, and a syllable-dividing mark adjacent to the candidate section. The candidate section may further comprise a spelling display block configured to display a spelling of a Chinese character or a Chinese phrase currently being entered. The spelling may be selected from a group consisting of an initial consonant, a vowel, a syllable-dividing mark and a tone.

The initial consonant key section may include 7 groups of keys: group 1: "b", "p", "m", and "f"; group 2: "d", "t", "n", and "l"; group 3: "g", "k", and "h"; group 4: "j", "q", and "x"; group 5: "zh", "ch", "sh", and "r"; group 6: "z", "c", and "s"; and group 7: "y" and "w". The function key section may include function keys selected from the group consisting of "backspace", "tab", "space", "enter", "page up" and "page down". The initial consonant keys and vowel keys may be represented by Zhu Yin Fu Hao phonetic symbols.

Among other advantages, the invention described above provides two on-screen Chinese phonetic keyboards. Both keyboards support simplified and traditional Chinese formats, and are configured to execute on both desktop and hand-held devices. The initial consonant keys, selected vowel keys, four tones, and a syllable dividing mark are arranged in such a way that a user can select desired keys in a smooth, clockwise direction. Thus, the speed of entering Chinese characters increases significantly. Also, by listing only selected vowel keys, the chance of false selection and a required area on the screen are reduced.

In another aspect of the invention, the invention features an on-screen Chinese radical keyboard including a function key section, a radical key section, a remainder key section, and a candidate section. The function key section is configured to allow on-line editing. The radical key section includes a plurality of keys representing number of strokes of a radical of a desired Chinese character. The remainder key section includes a plurality of keys representing number of strokes of a remainder of the desired Chinese character. And a candidate section is configured to allow entry of the desired Chinese character.

Embodiments of this aspect of the invention may include one or more of the following features.

The function key section may be positioned at a bottom portion of the keyboard. The radical key section may be positioned at a top portion of the keyboard. The remainder key section may be positioned at a first side portion of the keyboard. And the candidate section may be positioned at a second side portion of the keyboard. The candidate section includes three display modes: an English display mode, a radical candidate display mode, and a Chinese character candidate display mode. The English display mode is for selecting a desired English letter, a numeric, or a symbol. The radical candidate display mode is for selecting a radical. And the Chinese character candidate display mode is for selecting a desired Chinese character or Chinese phrase.

The radical key section may include a set of keys. Each key represents a number of strokes of a desired radical. The remainder key section may include a set of keys. Each key represents a number of strokes of a desired remainder.

Among other advantages, the invention with respect to the on-screen Chinese radical keyboard provides a function key section, a radical key section, a remainder key section, and a candidate section. The radical keys, the remainder keys, and the candidate section are arranged in such a way that a user can select desired keys in a smooth, clockwise direction. Thus, the speed of entering Chinese characters increases significantly.

In further another aspect of the invention, the invention features a method of entering a symbol of English keyboard before and after entering a Chinese character. The method includes switching automatically to an English display mode in the candidate section and selecting the symbol of English keyboard in the candidate section.

This aspect of the invention advantageously allows entry of English letters and numeric symbols in the candidate section during the time interval between entering two Chinese characters. Therefore, Chinese and English texts can be entered in any mixed format without having to switch between a Chinese keyboard and an English keyboard. This arrangement further increases entering speed when the text is a mixture of Chinese, English and numeric symbols.

In further another aspect of the invention, the invention features a method of entering a Chinese phrase containing at least 3 Chinese characters via an on-screen Chinese phonetic keyboard having a database containing the Chinese phrase. The method includes entering the spelling of a first and a second characters of the Chinese phrase; displaying automatically all phrases from the database whose first two characters' spelling is identical to that entered by a user; and selecting the Chinese phrase shown in the candidate section.

Among other advantages, the invention with respect to this aspect allows fast entry of Chinese phrases with 3 or more Chinese characters.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
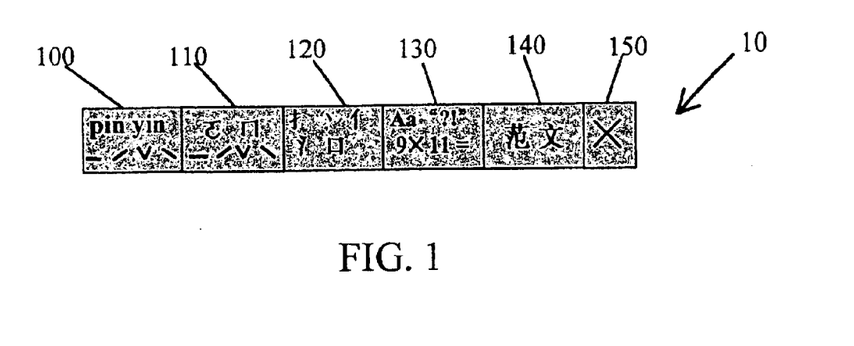
FIG. 1 is a main menu of an on-screen Chinese keyboard.

Referring to FIG. 1, a main menu 10 is at a top level of an on-screen Chinese keyboard. The on-screen Chinese keyboard is executed on a computer or another information devices. The on-screen Chinese keyboard integrates five features including a first Chinese phonetic keyboard, a second Chinese phonetic keyboard, a Chinese radical keyboard, an English keyboard, and a Chinese model article clipboard. Main menu 10 includes five keyboard selections: Chinese phonetic keyboard I selection 100, Chinese phonetic keyboard II selection 110, Chinese radical keyboard selection 120, English keyboard selection 130 and Chinese model article clipboard selection 140. Each selection is adapted to invoke the execution of an associated keyboard. Main menu 10 also includes an "X" selection 150 for a user to shut off the menu, thus terminating the execution of this application program. Selecting one of the five keyboard selections will cause the associated keyboard to display and execute on a screen of a computer or other information devices. Main menu 10 and the five keyboards are configured to float above all other application programs on the screen.

Figure 2:
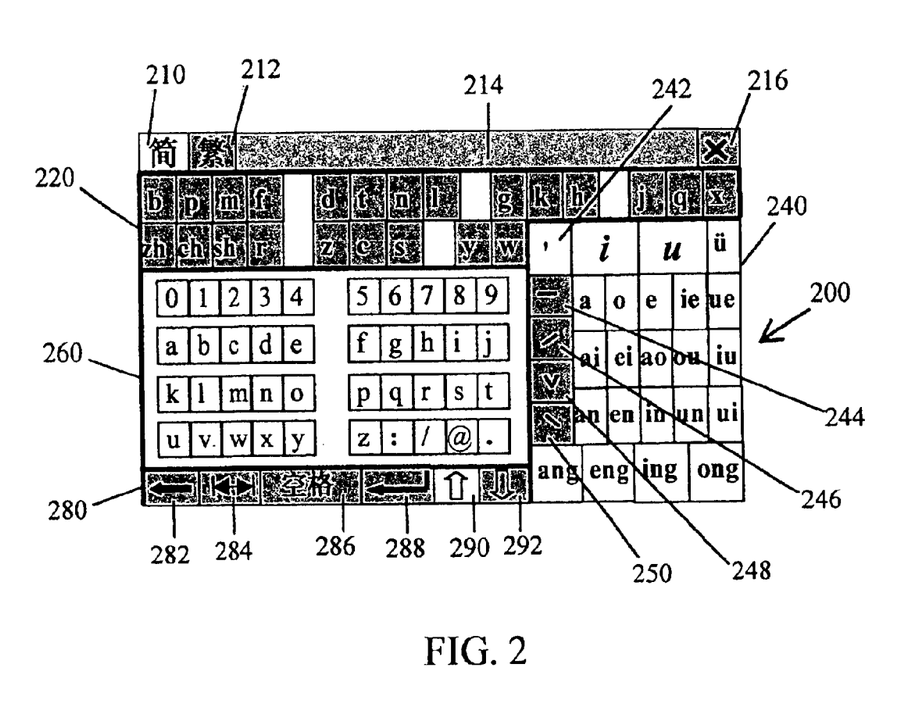
FIG. 2 represents an exemplary initial display of an on-screen Chinese phonetic keyboard I.

Referring to FIG. 2, an initial display of a Chinese phonetic keyboard I 200 is shown on the screen after selecting Chinese phonetic keyboard selection I 100. Chinese phonetic keyboard I 200 includes four major sections: an initial consonant key section 220, a vowel key section 240, a function key section 280, and a dual-mode candidate section 260. Keyboard I 200 further includes a "simple" key 210, a "traditional" key 212, a drag bar 214 and an "X" key 216. "Simple" key 210 and "traditional" key 212 allow a user to enter simple or traditional Chinese characters, respectively. Drag bar 214 allows a user to drag and place keyboard I 200 to a desired location on a computer screen. A user can shut off keyboard I 200 by selecting "X" key 216.

There is a general rule in Chinese phonetic system: the spelling of most Chinese characters starts with a consonant, followed by a simple or compound vowel, and ends with a tone. The spelling of others starts with a vowel and ends with a tone. The only exception to this rule is the spelling "er" which starts with a vowel and is followed by a consonant. But the spelling "er" is used infrequently. This spelling is used for only 12 Chinese characters among the 6000 characters collected in the dictionary edited by Jinglong Wu, Shang Wu press, 1986.

The arrangement of the four sections in Chinese phonetic keyboard I 200 is guided by the above rule to achieve maximum speed of entering Chinese text. A user can move a pointing device (e.g., a mouse) in a clockwise direction and sequentially click on a consonant, a vowel or vowels, a tone, and then select a Chinese character from candidate section 260. The movement of the pointing device is reduced to a minimum so that high entering speed can be achieved.

Initial consonant key section 220 has seven groups of initial consonant keys positioned at an upper portion of keyboard I 200. The seven groups are arranged on keyboard I 200 according to a standard order used in most Chinese phonetic textbooks. The seven groups of initial consonant keys are:

Group 1: "b", "p", "m", and "f",
Group 2: "d", "t", "n", and "l",
Group 3: "g", "k", and "h",
Group 4: "j", "q", and "x",
Group 5: "zh", "ch", "sh", and "r",
Group 6: "z", "c", and "s", and
Group 7: "y" and "w".

The groups of initial consonants are separated by small spaces, allowing the user to easily spot specific initial consonant.

Vowel key section 240 is positioned on a side portion of keyboard I 200. Vowel key section 240 includes fifteen simple vowel keys, seven compound vowel keys, one syllable dividing mark 242 and four tone selection keys. The fifteen simple vowel keys are "i", "u", "ü", "a", "o", "e", "ai", "ei", "ao", "ou", "an", "en", "ang", "eng", and "ong". The seven listed compound vowel keys are "ie", "ue", "iu", "in", "un", "ui" and "ing". Note that vowel key "un" actually represents two compound vowels, i.e., "un" and "ün". Because "ün" is only presented after "j", "q", "x", and "y" while "un" never follows these four consonants immediately, "ün" is generally written as "un".

Other compound vowel keys are not listed because they are combinations of simple vowel keys. There are thirteen unlisted compound vowel keys: "ia", "iao", "ian", "iang", "iong", "ua", "uo", "uai", "uang", "ueng", "uan", "üan", and "er". The decision as to whether a compound vowel should be listed is based on the following considerations. Among the seven listed compound vowels, "ie" and "ue" are not pronounced as the simple combination of "i"-"e" and "u"-"e", while "in", "ing", "iu", "un", and "ui" are the abbreviations of "ien", "ieng", "iou", "uen", and "uei", respectively. These seven compound vowels are listed to avoid confusion. Among the thirteen unlisted compound vowels, "er" can be represented by the simple vowel "e" (i.e., all the Chinese characters associated with "e" or "er" are listed as candidates when "e" key is clicked), because "e" alone is used as infrequently as "er". The remaining twelve compound vowels can be spelled by two of the simple vowels listed. For example, an unlisted compound vowel "iang" is a combination of "i" and "ang". Without listing all compound vowels, the total number of keys on keyboard I 200 is reduced, thus, reducing a chance of false selection and a required area on the screen.

Note that "i" and "u" are special simple vowel keys because they are the leading letters used to compose the other eleven compound vowels not shown. Because "i" and "u" are used frequently, they are placed in the top line with larger italic font and in wider boxes. Being located immediately next to initial consonant key section 220, "i" and "u" are likely to be the first vowel keys to be selected after selecting an initial consonant. Thus, the speed of entering compound vowels increases and the clockwise unidirectional mouse movement can be maintained, consequently yielding faster Chinese text input.

Syllable dividing mark 242 and the four tone selection keys are positioned near a center of keyboard I 200 and are adjacent to candidate section 260. The four tone selection keys include a high-level tone key 244, a rising tone key 246, a falling-rising tone key 248, and a falling tone key 250.

Candidate section 260 is positioned on the other side portion of keyboard I 200. Candidate section 260 of keyboard I 200 has two display modes: a Chinese character display mode and an English display mode. During a time interval between entering two Chinese characters or phrases, section 260 is in the English display mode as shown in FIG. 2. A first page of the English display mode includes numeric keys, lower-case English letters and four symbol keys: ":", "/", "@" and ".", as shown in FIG. 2. A user can select "page down" key 292 to toggle to a second page of the English display mode. Displaying English characters, numbers, and some other symbols in candidate section 260 is a special feature. With this feature, it is not necessary to switch between Chinese/English keyboards when typing texts of mixed Chinese and English characters.

Function key section 280 is positioned at a lower portion of keyboard I 200. Function key section 280 includes six function keys: "backspace" 282, "tab" 284, "space" 286, "enter" 288, "page up" 290, and "page down" 292. The function keys 282, 284, 286, and 288 allow a user to edit a target text at any time, without disrupting the display in the candidate section.

Figure 3:
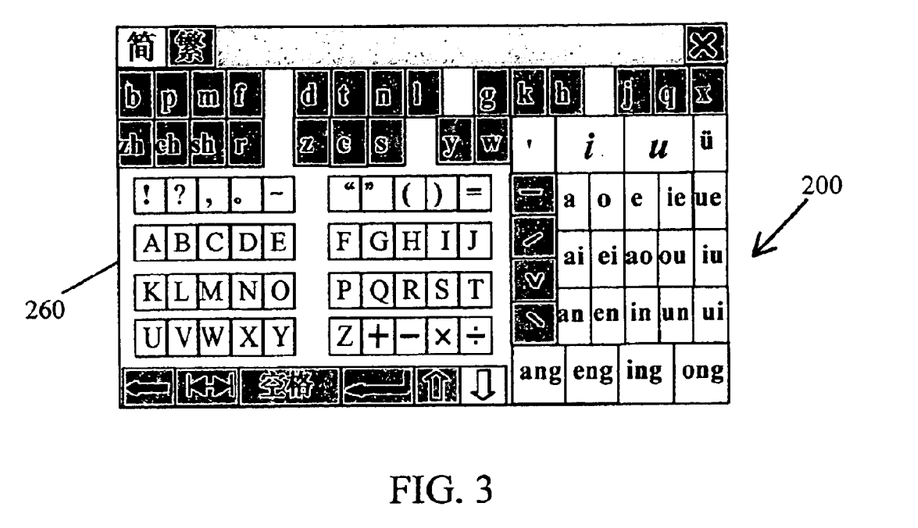
FIG. 3 is the on-screen Chinese phonetic keyboard I wherein capital English letters and other symbols are displayed in a candidate section.

Referring to FIG. 3, candidate section 260 is in the second page of the English display mode of keyboard I 200. The second page includes symbol keys and capital English letters. The English display mode allows a user to enter a symbol or an English letter during a time interval between entering two Chinese characters or phrases, thus providing a convenient venue for entering a Chinese-English combined text.

Figure 4:
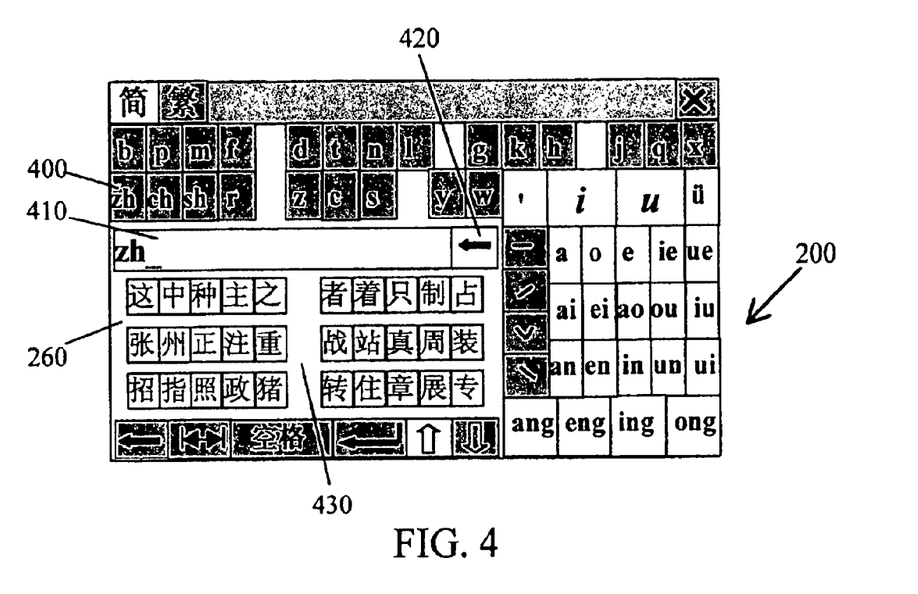
FIG. 4 is the on-screen Chinese phonetic keyboard I wherein an initial consonant "zh" has been selected.

Referring to FIG. 4, a user selects an initial consonant "zh" 400 on Chinese phonetic keyboard I 200. Candidate section 260 switches to the Chinese character display mode. The Chinese character display mode includes a spelling display block 410 positioned at an upper portion of section 260 and a candidate display block 430. The spelling display block 410 displays in real time selected initial consonants, vowels, syllable-dividing marks, tones, and Chinese characters. For example, initial consonant "zh" is shown in block 410 after a user selected initial consonant "zh" 400 in initial consonant key section 220. The spelling display block 410 further includes a "backspace" key 420 for editing a spelling in block 410. The rest of Chinese candidate section 260 is the candidate display block 430. Block 430 includes three lines of most frequently used Chinese characters with initial consonant "zh". More selections of Chinese characters can be found by the selection of "page down" key 292 in function key section 280. A user may select a desired Chinese character if the Chinese character appears at this time, thus, returning back to an initial display (the English display mode) for further input. A user may also further input a vowel, a tone and/or a syllable-dividing mark for finding a desired Chinese character.

Figure 5:
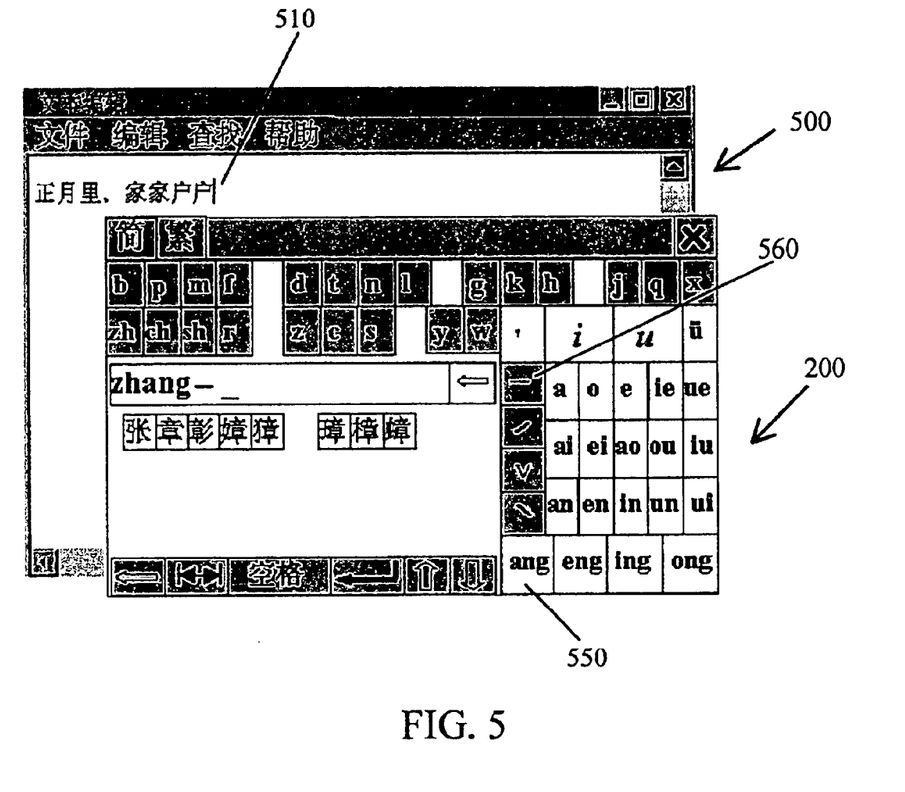
FIG. 5 is the on-screen Chinese phonetic keyboard I wherein a spelling "zhang-" of a Chinese character has been entered.

Referring to FIG. 5, a user selects initial consonant "zh" 400, a vowel "ang" 550 and a high-level tone "-". The spelling "zhang-" is shown in spelling display block 410. Immediately following the selection of "zhang-", Candidate section 260 displays all the Chinese characters with the spelling "zhang-". Then, the user can select a Chinese character with the spelling "zhang-" and enter the character to a Chinese editor 500 at a location where a cursor 510 currently resides.

Chinese phonetic keyboard I 200 also supports an on-line phrase formation method for efficiently indexing and entering long Chinese phrases. FIGS. 6, 7, 8, and 9 demonstrates the on-line phrase formation method by using a three-character phrase with a spelling "nong- nu/ mav".

Figure 6:
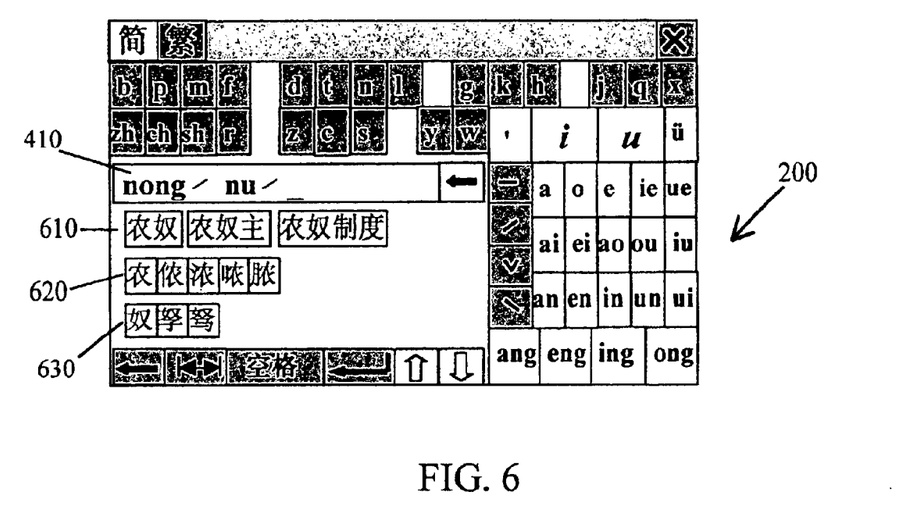
FIG. 6 is the on-screen Chinese phonetic keyboard I wherein a spelling "nong- nu/" of a two-character Chinese phrase has been entered.

Referring to FIG. 6, a user enters a spelling of two Chinese characters: "nong- nu/" on Chinese phonetic keyboard I 200. Candidate section 260 is in the Chinese display mode. The spelling "nong- nu/" is shown in spelling display block 430. The first line 610 of candidate display block 410 displays most often used Chinese phrases whose first two characters have the spelling "nong- nu/". The second line 620 of block 430 are candidate characters for the spelling "nong-". Similarly, the third line 630 of block 430 are candidate characters for the spelling "nu/". The user can select a desired phrase at the first line 610 of block 430 at this time. Otherwise, the user can continue to input a spelling of a third Chinese character.

Figure 7:
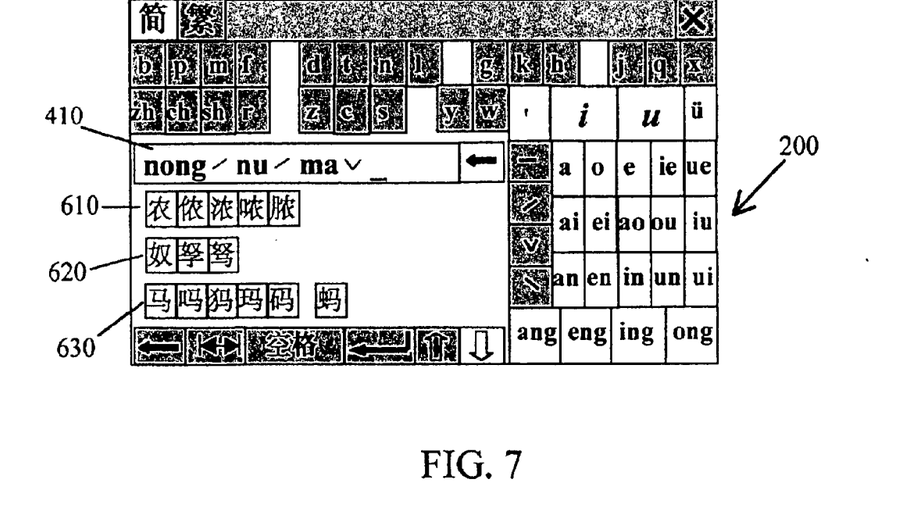
FIG. 7 is the on-screen Chinese phonetic keyboard I wherein a spelling "nong- nu/maⱴ" of a three-character Chinese phrase has been entered.

Referring to FIG. 7, the user further inputs a spelling "maˇ" of a third word in spelling display block 410. As a result, the first line 610, the second line 620, and the third line 630 of candidate display block 430 displays all Chinese characters with the spelling "nong-", "nu/", and "maˇ", respectively.

Figure 8:
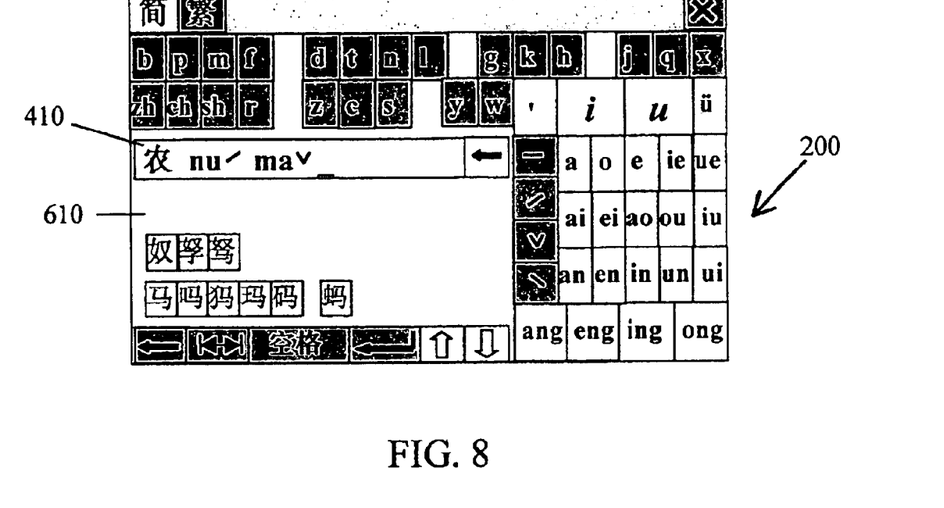
FIG. 8 is the on-screen Chinese phonetic keyboard I wherein the first Chinese character of the three-character Chinese phrase has been entered.

Referring to FIG. 8, the user selects a desired Chinese character with the spelling "nong-". Thus, the first line 610 of candidate display block 430 disappears. The second and the third characters with the spelling "nu/" and "maˇ" can be selected in the same way. Then, the three-character phrase with the spelling "nong- nu/ maˇ" is indexed and saved in a database associated with the on-screen Chinese keyboard application program.

Figure 9:
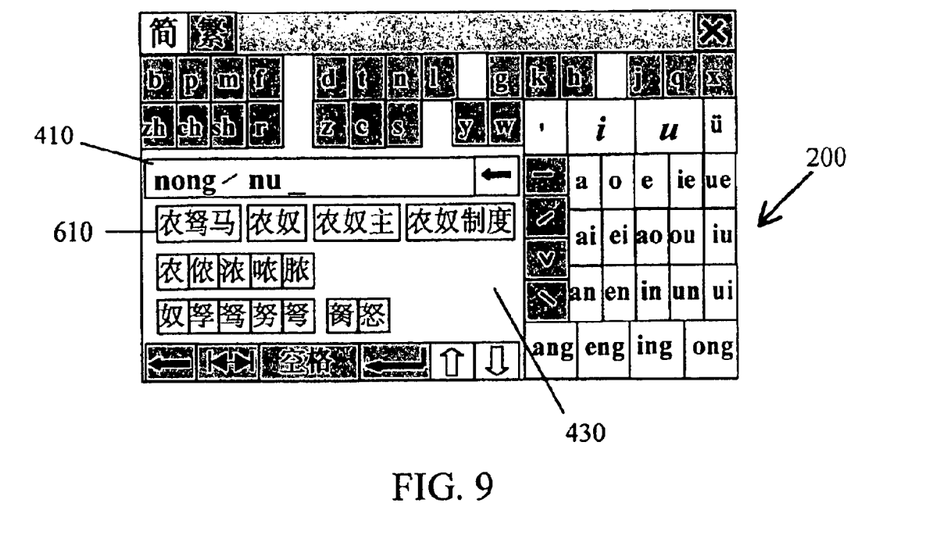
FIG. 9 is the on-screen Chinese phonetic keyboard I wherein four candidate phrases have been displayed for a two-character spelling not yet completely entered.

Referring to FIG. 9, the user inputs the spelling "nong- nu" again after the three-character phrase has been indexed and saved. Even the spelling "nong- nu/" for the first two characters are not completed, the first line 610 of candidate display block 430 has displayed the three character phrase along with other phrases whose first two characters have the spelling "nong- nu". Using this method, a user can index and store most often used long phrases, thus effectively increasing overall Chinese character entering speed.

The on-screen Chinese-English keyboard also supports another Chinese phonetic keyboard with initial consonants and vowels represented by Zhu Yin Fu Hao (another set of Chinese phonetic symbols used mainly in Taiwan and Hong Kong) when selecting Chinese phonetic keyboard II selection 110 on main menu 10. The Chinese phonetic keyboard based on Zhu Yin Fu Hao in this embodiment can be extended from Chinese phonetic keyboard I 200. A Chinese phonetic keyboard based on Zhu Yin Fu Hao will be shown in FIG. 19.

Figure 10:
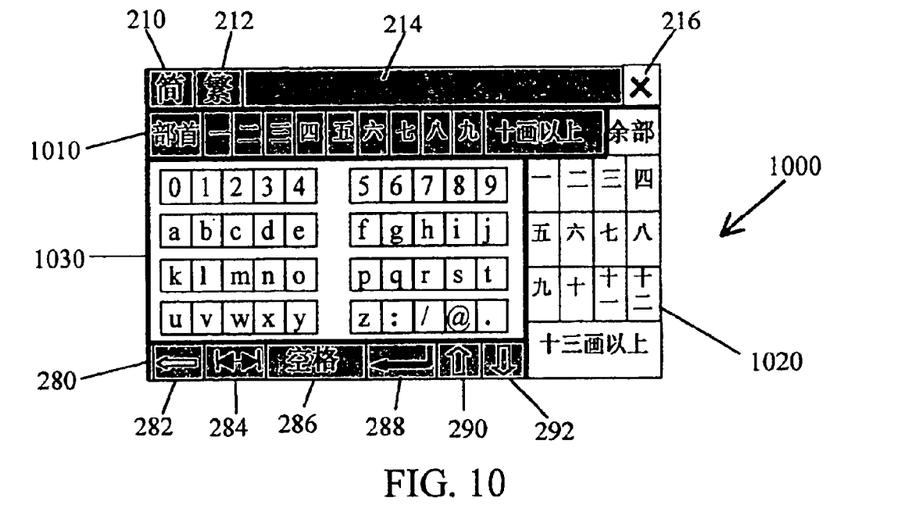
FIG. 10 is an initial display of an on-screen Chinese radical keyboard.

The on-screen Chinese-English keyboard also supports a radical based input method. By selecting Chinese radical keyboard selection 120 on main menu 10, an on-screen Chinese radical keyboard will pop-up on the screen. Referring to FIG. 10, the on-screen Chinese radical keyboard 1000 includes four major sections: a radical key section 1010, a remainder key section 1020, a candidate section 1030, and a function key section 280. Radical key section 1010 includes ten keys representing number of strokes of a radical of a Chinese character. The ten keys are "1 stroke", "2 strokes", "3 strokes", "4 strokes", "5 strokes", "6 strokes", "7 strokes", "8 strokes", "9 strokes", and "10 strokes and above". Similarly, remainder key section 1020 includes thirteen keys representing number of strokes of a remainder of a Chinese character. The thirteen keys are "1 stroke", "2 strokes", "3 strokes", "4 strokes", "5 strokes", "6 strokes", "7 strokes", "8 strokes", "9 strokes", "10 stroke", "11 strokes", "12 strokes", and "13 strokes and above". Candidate selection 1030 has three display modes: Chinese display mode, English display mode, and radical display mode. Function key section 280 includes six function keys the same as those of Chinese phonetic keyboard I 200.

Figure 11:
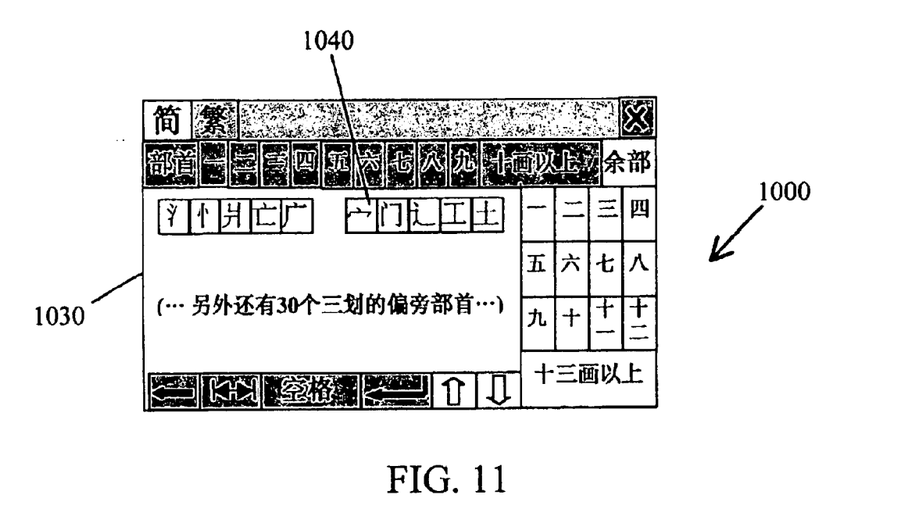
FIG. 11 is the on-screen Chinese radical keyboard wherein a radical with three strokes is selected.

To enter a desired Chinese character via keyboard 1000, a user first selects the number of strokes of a radical of the desired Chinese character. Referring to FIG. 11, the user selects "3 stokes". Candidate section 1030 will switch to radical display mode and display all radicals with three strokes. In FIG. 11, the user selects a radical 1040 with three strokes.

Figure 12:
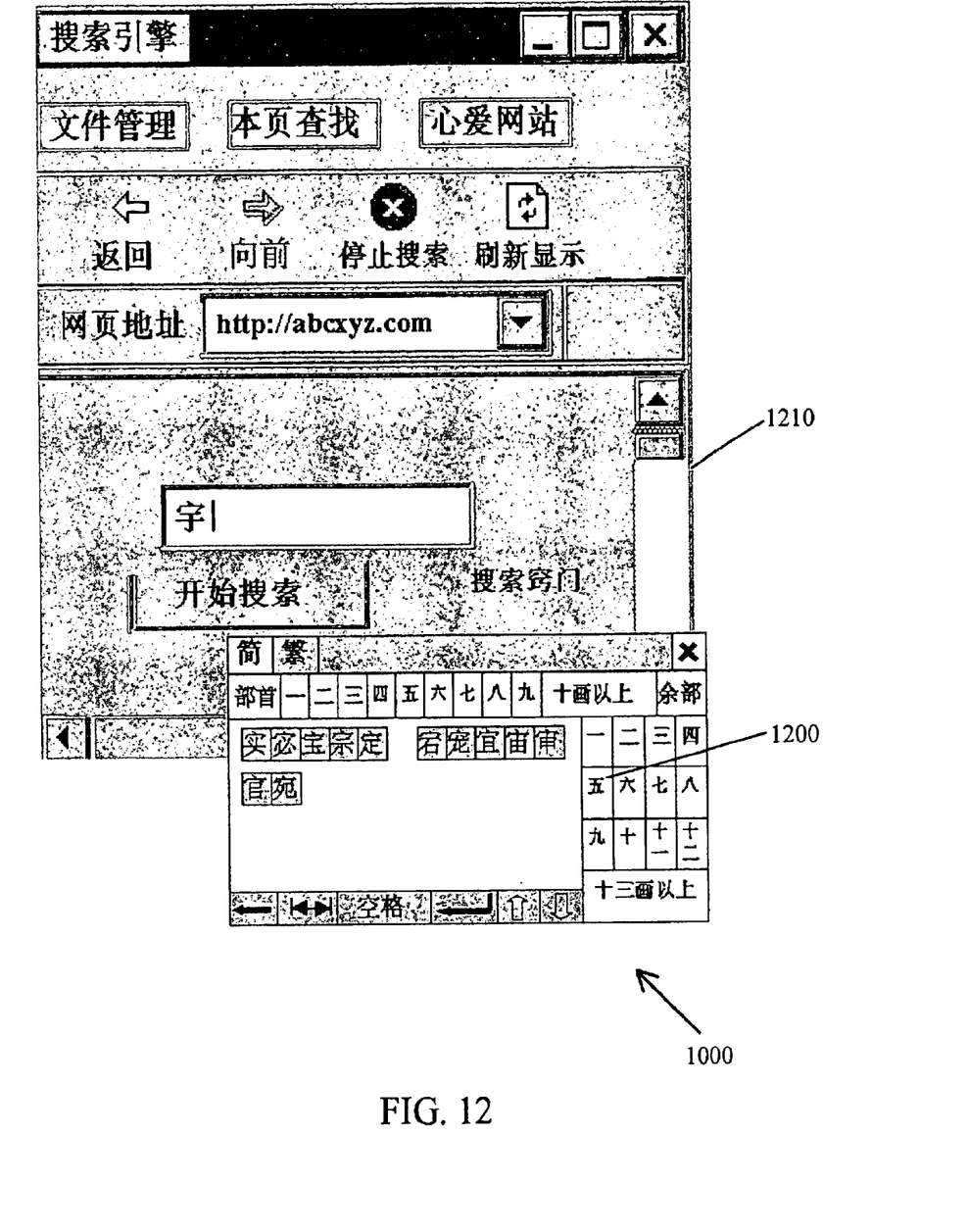
FIG. 12 is the on-screen Chinese radical keyboard of FIG. 11 wherein a remainder with five strokes is further selected.

Once a radical is chosen, the next step is to select the number of stroke of the remainder. Referring to FIG. 12, the user selects "5 strokes" as the number of strokes of the remainder. Thus, candidate section 1030 switches to Chinese display mode where all the characters having the selected radical and a remainder with five strokes are displayed. Then, the user can select the desired character and enter the desired character to a text editor or a browser 1210 for search purpose.

Figure 13:
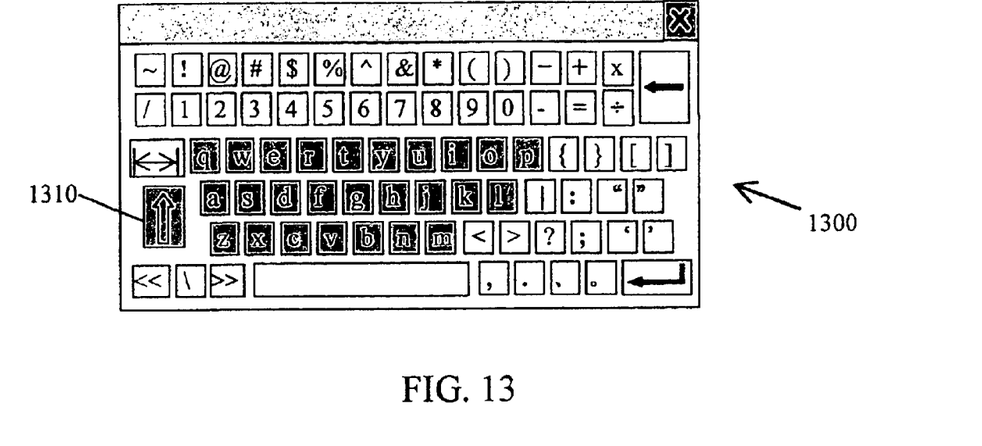
FIG. 13 is an initial display of an on-screen English keyboard.
Figure 14:
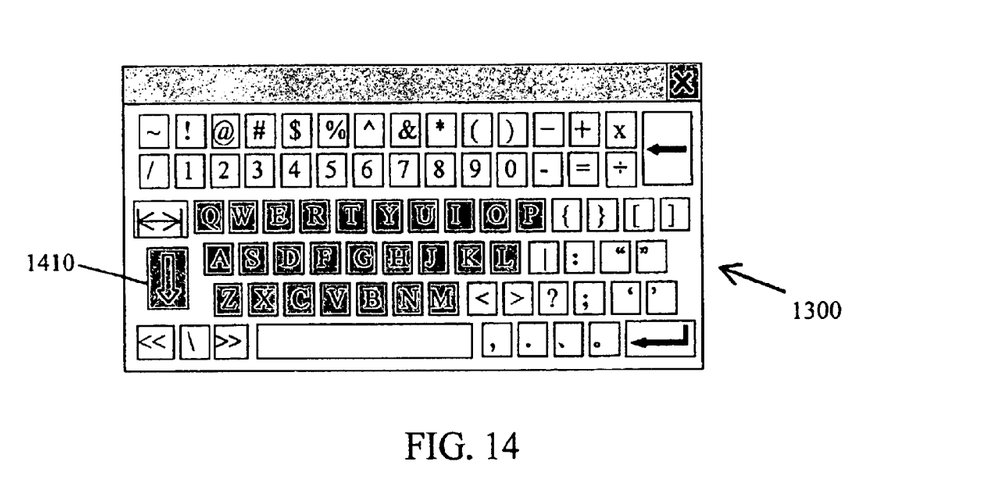
FIG. 14 is the on-screen English keyboard wherein an "up" key is selected.

The on-screen Chinese-English keyboard also allows a user to input English letters and other symbols using a standard English keyboard. By selecting English keyboard selection 130 on main menu 10, an on-screen English keyboard 1300 will popup on the screen. Referring to FIGS. 13 and 14, on-screen English keyboard 1300 has a key arrangement similar to a standard English keyboard and has two display modes. FIG. 13 shows a first display mode which exhibits keys including many symbols and lower-case English letters and allows the user to select these keys. By selecting a "page up" key 1310, on-screen English keyboard 1300 switches to a second display mode which exhibits keys including the same symbols and upper-case English letters. To switch back to the first display mode, the user can select a "page down" key 1410.

Figure 15:
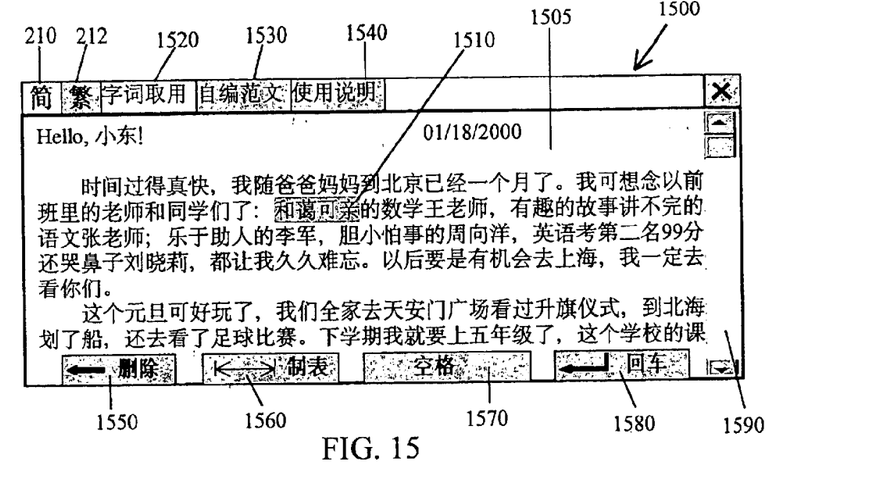
FIG. 15 is an on-screen Chinese model article clipboard wherein a Chinese phrase is selected.

The last selection on main menu 10 is Chinese model article clipboard selection 140. Referring to FIG. 15, a Chinese model article clipboard 1500 pops up after selecting selection 140 on main menu 10. Chinese model article clipboard 1500 has two modes: a phrase selecting mode and a model article editing mode. By selecting a phrase-selecting key 1520, clipboard 1500 switches to phrase selecting mode, as shown in FIG. 15. Phrase selecting mode allows a user to highlight a character, a phrase, a sentence, a paragraph, or even a whole article from a model article 1505 and to enter the selection to a text editor. Phrase selecting mode also provides four function keys, i.e., a "back space" key 1550, a "tab" key 1560, a "space" key 1570, and a "enter" key 1580, for the user to edit a text. The user can also use a scroll bar 1590 to access other part of a long model article. A help key 1540 allows the user to read an on-line help regarding the usage of clipboard 1500. To switch to the model article editing mode, the user can select an article-editing key 1530.

Figure 16:
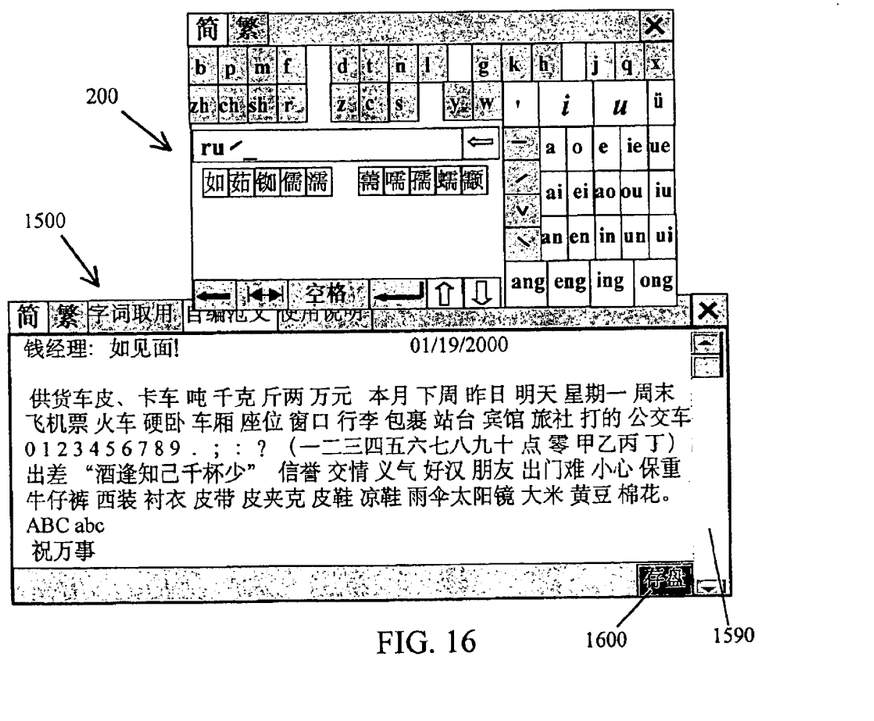
FIG. 16 is the on-screen Chinese model article clipboard in the model article editing mode.

Referring to FIG. 16, clipboard 1500 is in the model article editing mode. Keyboard I 200 pops up automatically in this mode for the user to edit a model article. The user selects the "save" key 1600 to save an revised model article.

A number of embodiments of the invention have been described. Nevertheless, it will be understood that various modifications may be made without departing from the spirit and scope of the invention.

Figure 17:
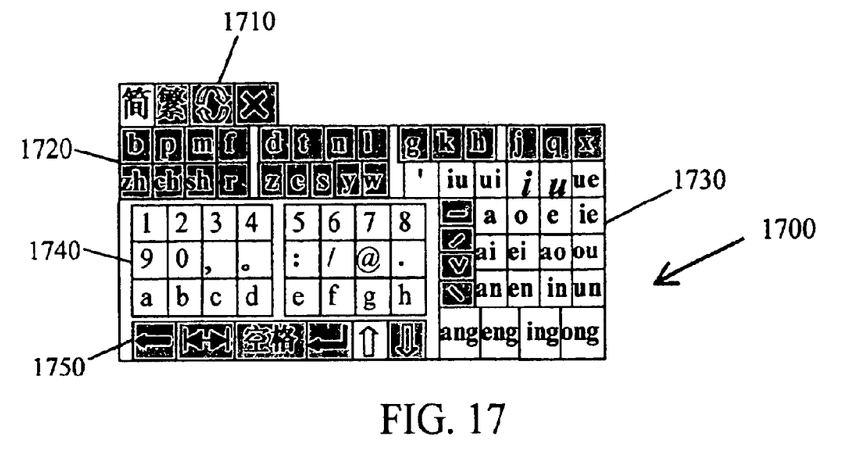
FIG. 17 is an initial display of an on-screen Chinese phonetic keyboard for a hand-held device.

For example, the arrangement of keys on on-screen Chinese phonetic keyboard I 200 can be modified to fit on a screen of a hand-held device. Referring to FIG. 17, an on-screen Chinese phonetic keyboard 1700 for use on a hand-held device is shown. Keyboard 1700 also includes four major portions: an initial consonant section 1720, a vowel section 1730, and a Candidate section 1740 and a function key section 1750. Sections 1720 and 1750 contain the same keys as those in keyboard I 200. The only difference is that those keys are arranged in a more compact manner. In section 1730, the key "u" represents the dual function of simple vowels "u" and "ü". Section 1740 has smaller display area than section 260 in keyboard I 200. Thus section 1740 allows only three lines of keys to display. A user can also select a switch key 1710 to switch to other types of keyboards, for example, a Chinese radical keyboard, an English keyboard, or a model article clipboard.

Figure 18:
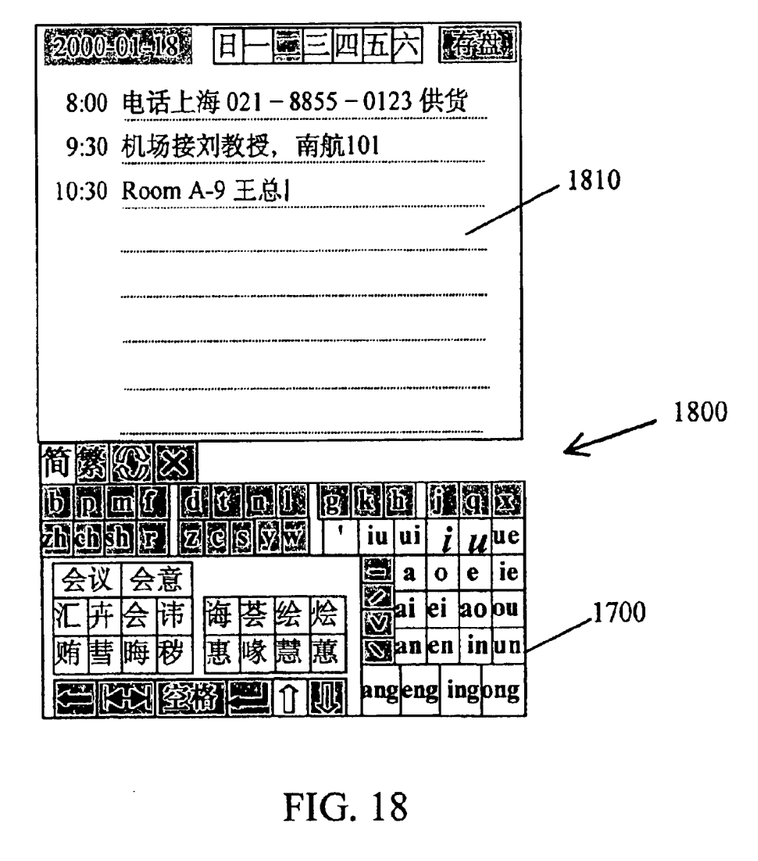
FIG. 18 is the on-screen Chinese keyboard as applied for entering Chinese, English and other symbols on a hand-held device.

Referring to FIG. 18, keyboard 1700 is applied on a calendar application 1800 of a hand-held device. Calendar application 1800 includes a note section 1810 and keyboard 1700 allowing a user to enter Chinese characters to note section 1810.

Figure 19:
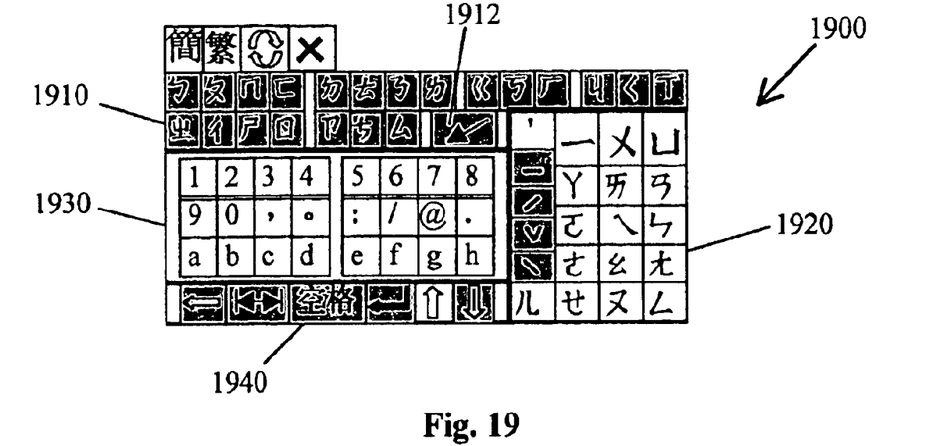
FIG. 19 is an initial display of an on-screen Chinese phonetic keyboard II.

Referring to FIG. 19, a Chinese phonetic keyboard II 1900 is used on a hand-held device. The format and operation of Chinese phonetic keyboard II 1900 is quite similar to Chinese phonetic keyboard I 200. However, keyboard II 1900 does use a different set of phonetic symbols, i.e., Zhu Yin Fu Hao.

Phonetic keyboard II 1900 includes four section: initial consonant section 1910, vowel section 1920, candidate section 1930 and function key section 1940. In keyboard II, there are only twenty-one initial consonants: ㄅㄆㄇㄈ, ㄉㄊㄋㄌ, ㄍㄎㄏ, ㄐㄑㄒ, ㄓㄔㄕㄖ, and ㄗㄘㄙ. All initial consonants are listed. Initial consonants "y" and "w" in keyboard I 200 do not have counterparts in keyboard II 1900. Therefore, there is a room for a dedicated "cancel" key 1912 in initial consonant section 1910 to cancel the Chinese candidate display mode.

There are 16 simple (or primitive) vowels in the Zhu Yin Fu Hao system: ㄧㄨㄩ, ㄚㄛㄜㄝ, ㄞㄟㄠㄡ, ㄢㄣ, ㄤㄥ, and ㄦ. They are all listed in vowel section while none of the compound vowels are listed as all the compound vowels are plain combinations of the simple vowels, both in pronunciation and writing.

Three simple vowels ㄧ, ㄨ and ㄩ are used more frequently than the other vowels. All the compound vowels start with one of these three simple vowels, followed by another simple vowel. So these three simple vowels sit in larger boxes and are also displayed in a larger italic font. Note that Zhu Yin Fu Hao is often used along with traditional Chinese characters.

Accordingly, other embodiments are within the scope of the following claims.

What is claimed is:

1. An on-screen Chinese phonetic keyboard comprising
a function key section configured to allow on-line editing, the function key section being positioned at a lower portion of the keyboard;
an initial consonant key section configured to enter an initial consonant of a desired Chinese character, the initial consonant key section being positioned at an upper portion of the keyboard;
a vowel key section including less than 18 compound vowels, the vowel key section being configured to allow entry of a vowel of the desire chinese character, the vowel key section being positioned at a first side portion of the keyboard; and
a candidate section configured to allow entry of the desired Chinese character, the candidate section being positioned at a second side portion of the keyboard.

2. An on-screen Chinese phonetic keyboard comprising:
a function key section configured to allow on-line editing;
an initial consonant key section configured to enter an initial consonant of a desired Chinese character;
a vowel key section including less than 18 compound vowels, the vowel key section being configured to allow entry of a vowel of the desired Chinese character and to allow a user to select a compound vowel not listed in the vowel key section by selecting the vowel "i" or the vowel "u" and then selecting a listed simple vowel; and
a candidate section configured to allow entry of the desired Chinese character.

3. The on-screen Chinese phonetic keyboard of claim 2 wherein the vowel key section includes at least 7 compound vowels: "ie", "ue", "iu", "in", "un", "ui ", and "ing".

4. The on-screen Chinese phonetic keyboard of claim 2 wherein the vowel key section further includes 15 simple vowels: "i", "u", "ü", "a", "o", "e", "ai ", "ei", "ao", "ou", "an ","en ", "ang ", "eng ", and "ong".

5. The on-screen Chinese phonetic keyboard of claim 2 wherein the candidate section has two display modes including
a Chinese character candidate display mode for selecting the desired Chinese character or Chinese phrase; and
an English display mode for selecting a desired English letter, a numeric, or a symbol.

6. The on-screen Chinese phonetic keyboard of claim 5 wherein the candidate section displays either simplified Chinese characters or traditional Chinese characters in the Chinese character candidate display mode.

7. The on-screen Chinese phonetic keyboard of claim 2 wherein the vowel key section further includes
tone selection keys positioned adjacent to the candidate section; and
a syllable-dividing mark adjacent to the candidate section.

8. The on-screen Chinese phonetic keyboard of claim 2 wherein the candidate section further comprises a spelling display block configured to display a spelling of a Chinese character currently being entered, the spelling being selected from a group consisting of an initial consonant, a vowel, a syllable-dividing mark and a tone.

9. The on-screen Chinese phonetic keyboard of claim 2 wherein the initial consonant key section includes
group 1: "b", "p", "m", and "f";
group 2: "d", "t", "n", and "l";
group 3: "g", "k", and "h";
group 4: "j", "q", and "x";
group 5: "zh", "ch", "sh", and "r";
group 6: "z", "c", and "s"; and
group 7: "y" and "w".

10. The on-screen Chinese phonetic keyboard of claim 2 wherein the function key section includes function keys selected from the group consisting of "backspace", "tab", "space", "enter", "page up" and "page down".

11. The on-screen Chinese phonetic keyboard of claim 2 wherein initial consonant keys and vowel keys are represented by Zhu Yin Fu Hao phonetic symbols.

12. An on-screen Chinese radical keyboard comprising
a radical key section including keys to allow a user to select the number of strokes of a radical of a Chinese character;
a remainder key section including keys to allow the user to select the number of strokes of a remainder of the Chinese character; and
a candidate section configured to allow selection of a radical or a Chinese character.

13. The on-screen Chinese radical keyboard of claim 12, wherein the radical key section is positioned at a top portion of the keyboard, the remainder key section is positioned at a first side portion of the keyboard, and the candidate section is positioned at a second side portion of the keyboard.

14. The on-screen Chinese radical keyboard of claim 12 wherein the candidate section includes three display modes
- an English display mode for selecting a desired English letter, a numeric, or a symbol
- a radical candidate display mode for selecting a radical, and
- a Chinese character candidate display mode for selecting a desired Chinese character or Chinese phrase.

15. The on-screen Chinese radical keyboard of claim 12 wherein the radical key section includes a set of keys, each key representing a number of strokes of radicals.

16. The on-screen Chinese radical keyboard of claim 12 wherein the remainder key section includes a set of keys, each key representing a number of strokes of remainders.

17. The on-screen Chinese radical keyboard of claim 12 wherein the function key section includes function keys selected from the group consisting of "backspace", "tab", "space", "enter", "page up", and "page down".

18. A method of entering a symbol of English keyboard comprising
- after entering a Chinese character via an on-screen Chinese keyboard having a candidate sections, switching automatically to an English display mode in the candidate section of the on-screen Chinese keyboard; and
- selecting the symbol of English keyboard in the candidate section.

19. A method comprising:
- displaying a first set of keys at a first portion of a display screen to allow a user to enter the spelling of a character or word of a first language;
- displaying candidates of characters or words of the first language in a second portion of a display screen, the candidates corresponding to the spelling entered by the user; and
- upon receiving a selection of a candidate displayed in the second portion of the display screen, automatically displaying a second set of keys at the second portion of the display screen to allow the user to enter the spelling of a character or word of a second language.

20. The method of claim 19 wherein the fist language comprises Chinese.

21. A method comprising
- displaying an initial consonant key section on a screen to allow entry of an initial consonant of a Chinese character; and
- displaying a vowel key section on the screen, the vowel key section including less than 18 compound vowels, the vowel key section to allow entry of a vowel of the Chinese character and to allow selection of a compound vowel not listed in the vowel key section by selecting a vowel "i" or a vowel "u" and then selecting a listed simple vowel.

22. The method of claim 21, further comprising displaying a candidate section configured to allow entry of the Chinese character.

\* \* \* \* \*